(12) United States Patent
Cox

(10) Patent No.: US 9,898,523 B2
(45) Date of Patent: Feb. 20, 2018

(54) TABULAR DATA PARSING IN DOCUMENT(S)

(71) Applicant: ABB Research Ltd., Zurich (CH)

(72) Inventor: David Neil Cox, Raleigh, NC (US)

(73) Assignee: ABB Research Ltd., Zurich (CH)

( * ) Notice: Subject to any disclaimer, the term of this patent is extended or adjusted under 35 U.S.C. 154(b) by 1038 days.

(21) Appl. No.: 13/867,776

(22) Filed: Apr. 22, 2013

(65) Prior Publication Data

US 2014/0317113 A1 Oct. 23, 2014

(51) Int. Cl.
*G06F 17/30* (2006.01)
*G06F 17/24* (2006.01)

(52) U.S. Cl.
CPC ...... *G06F 17/30598* (2013.01); *G06F 17/246* (2013.01); *G06F 17/30563* (2013.01)

(58) Field of Classification Search
None
See application file for complete search history.

(56) References Cited

U.S. PATENT DOCUMENTS

| | | | | |
|---|---|---|---|---|
| 6,006,240 | A * | 12/1999 | Handley | ............ G06K 9/00449 715/212 |
| 6,424,982 | B1 | 7/2002 | Vogel | |
| 8,037,090 | B2 | 10/2011 | Loeser et al. | |
| 8,249,344 | B2 | 8/2012 | Viola et al. | |
| 8,250,464 | B2 | 8/2012 | Dang et al. | |
| 2002/0099715 | A1 | 7/2002 | Jahnke et al. | |
| 2003/0097384 | A1 * | 5/2003 | Hu | ........................ G06F 17/245 715/234 |
| 2003/0123727 | A1 * | 7/2003 | Kanatsu | ............. G06K 9/00449 382/173 |
| 2004/0225673 | A1 * | 11/2004 | Beck | ................. G06F 17/30598 |
| 2005/0022106 | A1 | 1/2005 | Kawai et al. | |
| 2005/0108630 | A1 | 5/2005 | Wasson et al. | |
| 2006/0106837 | A1 | 5/2006 | Choi | |
| 2008/0208855 | A1 * | 8/2008 | Lingenfelder | .... G06F 17/30592 |
| 2008/0282153 | A1 | 11/2008 | Kindelberg et al. | |

(Continued)

OTHER PUBLICATIONS

Zanibbi et al. "A Survey of Table Recognition", Int'l Journal on Document Analysis and Recognition, Apr. 1, 2004.*

(Continued)

*Primary Examiner* — Charles Adams
(74) *Attorney, Agent, or Firm* — Cooper Legal Group, LLC

(57) ABSTRACT

One or more techniques and/or systems are provided for parsing tabular data of a document. That is, a document may comprise arbitrarily formatted content (e.g., an equipment inspection report generated by an engineer). Respective rows of the document may be clustered into one or more row clusters based upon row proximity and/or numeric content (e.g., rows having similar numeric content may comprise logically related information). One or more vertical clusters may be generated within respective row clusters based upon vertical overlap. In this way, row clusters and/or vertical clusters may be searched for one or more values that may be assigned to a search term. For example, a row cluster may comprise a search term "Average temp". One or more vertical clusters within the row cluster may be searched for a word that matches a pattern criteria (e.g., a two digit number), which may be assigned to the search term.

20 Claims, 11 Drawing Sheets

(56) References Cited

U.S. PATENT DOCUMENTS

2011/0271177 A1* 11/2011 Bastos dos Santos ............... G06F 17/243 715/256
2012/0278341 A1 11/2012 Ogilvy et al.

OTHER PUBLICATIONS

Thomas Kieninger, "Table Structure Recognition Based on Robust Block Segmentation," Proc. Document Recognition V, pp. 22-32, Jan. 1998.*

"An Initial Characterization of Industrial Graphical User Interface Systems", Penelope Brooks, Brian Robinson and Atif M. Memon, Apr. 1-4, 2009,International Conference on Software Testing Verification and Validation, pp. 11-20.

"A Fast Preprocessing Method for Table Boundary Detection: Narrowing Down the Sparse Lines using Solely Coordinate Information", Ying Liu, Prasenjitmitra and C. Lee Giles, Sep. 16-19, 2008, The Eighth IAPR International Workshop Document Analysis Systems, 8 pgs.

"Chapter 23: Question Answering and Summarization" from a book entitled Speech and Language Processing: An Introduction to Natural Language Processing, Computational Linguistics, and Speech Recognition, Daniel Jurafsky and James H Martin, Oct. 5, 2007, pp. 765-810.

"Recursive X-Y Cut using Bounding Boxes of Connected Components", Jaekyu Ha, Robert M. Haralick and Ihsin T. Phillips, Aug. 14-16, 1995, Proceedings of the Third International Conference on Document Analysis and Recognition, vol. 2, pp. 952-955.

"A Table Detection Method for Multipage PDF Documents via Visual Seperators and Tabular Structures", Jing Fang, Liangcai Gao, Kun Bai, Ruihang Qiu, Xin Tao,and Zhi Tang, Sep. 18-21, 2011, International Conference on Document Analysis and Recognition, pp. 779-783.

"Automatic Document Structure Analysis of Structured PDF Files", Rosmayati Mohemad, Abdul Razak Hamean, Zulaiha Ali Othman, Noor Maizura and Mohamad Noor, 2011, International Journal on New Computer Architectures and Their Applications, The Society of Digital Information and Wireless Communications, pp. 404-411.

"Design of an end-to-end method to extract information from tables", Ana Costa E Silva, Alfpio M. Jorge and Luis Torgo, Feb. 25, 2006, International Journal Document Analysis Research, vol. 8, pp. 1-47.

"Parts that add up to a whole: a framework for the analysis of tables", Ana Costa E Silva, 2010, Phd Thesis, University of Edinburgh, 278 pgs.

"PDF-TREX: A Approach for Recognizing and Extracting Tables from PDF Documents", Ermelinda Oro and Massimo Ruffolo, 10th International Conference on Document Analysis and Recognition, Jul. 25-29, 2009, pp. 906-910.

"An Initial Study of Customer Reported GUI Defects", Brian Robinson and Penelope Brooks, Apr. 1-4, 2009, IEEE International Conference on Software Testing Verification and Validation Workshops, pp. 267-274.

"Approximating Deployment Metrics to Predict Field Defects and Plan Corrective Maintenance Activities", Will Snipes, Brian Robinson and Penelope Brooks, 20th International Symposium on Software Reliability Engineering, Nov. 16-19, 2009, pp. 90-98.

"A Sruvey of Table Recognition: Models, Observations, Transformations, and Inferences", R. Zanibbi, D. Blostein and J.R. Cordy, Oct. 24, 2003, International Journal of Document Analysis and Recognition, pp. 1-30.

* cited by examiner

TABULAR DATA PARSING IN DOCUMENT(S)

BACKGROUND

Today, information may be conveyed through various types of documents, such as text documents, images, portable document format (PDF) documents, web pages, scanned documents, spreadsheets, etc. Some documents may be arbitrarily formatted by an author, which may result in erroneous information when mining data from such documents. For example, an inspection report (e.g., an equipment inspection report) may comprise multiple regions that vary in how information is organized (e.g., a first region may list equipment temperatures along multiple rows, whereas a second region may list equipment locations down multiple columns). Thus, parsing the inspection report may not result in logical partitions of information, but may result in clusters of data that do not correspond to how the author organized information within the inspection report.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for parsing tabular data of a document are provided herein. It may be appreciated that tabular data may correspond to any type of information that may be spatially organized into blocks of information (e.g., a block corresponding to a row of information, a column of information, or other organizational types of information), and that a document may correspond to any type of electronic document such as a presentation file, a portable document format (PDF) document. a spreadsheet, a text document, a scanned document, an image, a web page, or other types of documents that may comprise tabular data and/or arbitrarily formatted data (e.g., an inspection report, such as an equipment inspection report, comprising information that is arbitrarily organized into regions, rows, columns, etc.).

In some embodiments, the document may comprise one or more rows (e.g., a row may correspond to a height of a character and a width of the document) and/or one or more columns (e.g., a column may correspond to a width of a character and a height of the document). Rows of the document may be clustered based upon row proximity and/or numeric content to generate one or more row clusters. Row proximity may correspond to a distance (e.g., a number of rows or an amount of white space) between a first row (e.g., or a first row cluster) and a second row (e.g., or a second row cluster) being evaluated for clustering, such that if the row proximity is not satisfied between the first row and the second row, then the first row and the second row are not clustered together. For example, if the first row occurs towards a beginning of the document and the second row occurs towards an end of the document where multiple rows of white space occur between the first row and the second row, then content of the first row and content of the second row may not have a logical correspondence (e.g., the first row may comprise content associated with a date of the document, while the second row may comprise content associated with experimental results). The numeric content may correspond to a percentage of numeric characters within a row, a percentage of numeric words within a row (e.g., $H_2O$, Model3200, first shift, etc.), or other various metrics used to identify an amount of numbers within a row compared with an amount of non-numbers within the row. If a first numeric content of a first row and a second numeric content of a second row do not exceed a numeric deviation threshold (e.g., a deviation of 5%, between a first numeric content of 20% and a second numeric content of 25%, may be within a numeric deviation threshold of 24%), then the first row and the second row may be clustered into a row cluster, otherwise the first row may be grouped into a first row cluster and the second row may be separately grouped into a second row cluster. In this way, respective rows of the document may be clustered into one or more row clusters based upon row proximity and/or numeric content. It may be appreciated that a word may corresponding to a character (e.g., a symbol "&", a letter "y", a number "4", etc.), a grouping of characters (e.g., "oxygen"), and/or multiple groupings of characters (e.g., "oxygen measurement").

One or more vertical clusters may be generated for respective row clusters. For example, a current row cluster may comprise a first row, a second row, and a third row. In an example, vertical overlap between a first word within the first row and a second word within the second row may be identified. The first word and the second word may be clustered into a first vertical cluster within the current row cluster. In another example, if no vertical overlap is identified between a third word, within the third row, and at least one of the first word or the second word within the first vertical cluster, then the third word may be clustered into a second vertical cluster, but not the first vertical cluster, within the current row cluster. In this way, the document may be parsed into row clusters and/or vertical clusters within respective row clusters, which may facilitate identification of information within the document. For example, a matching row cluster comprising a search term (e.g., "Oxygen temperature") may be identified. One or more vertical clusters within the matching row cluster may be searched using a pattern criteria (e.g., a pattern such as a two digit number or a three digit number followed by either a "C" or an "F") to identify a value for the search term. The value may be extracted and/or assigned to the search term, such as within a database. In this way, a database may be populated with information from the document in an organized and/or logical manner.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
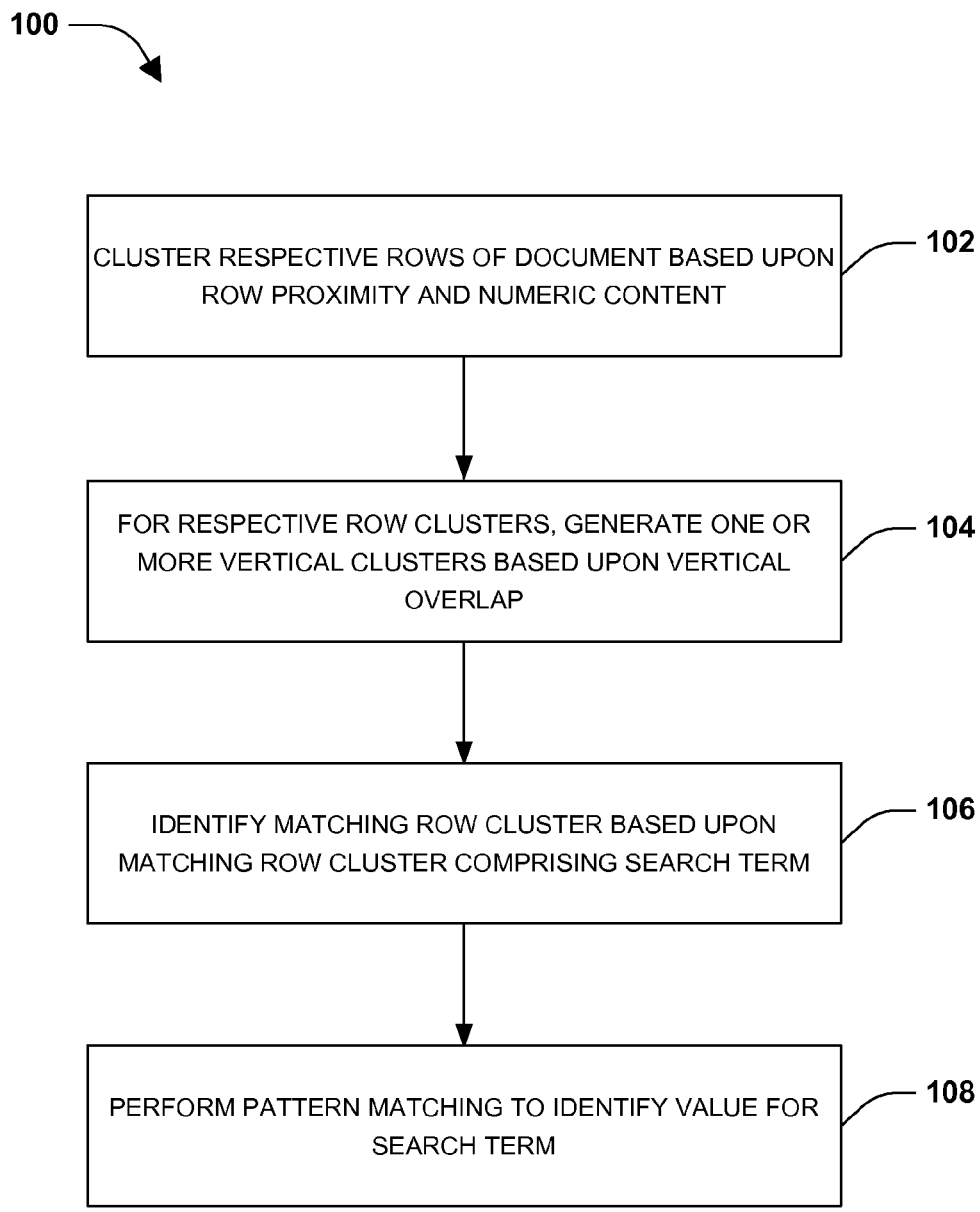
FIG. 1 is a flow diagram illustrating an exemplary method of parsing tabular data of a document.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

An embodiment of parsing tabular data of a document is illustrated by an exemplary method 100 of FIG. 1A. In some embodiments, the document may comprise arbitrarily formatted data (e.g., an inspection report or a document scanned into a computing device may comprise information arbitrarily organized by an author, as opposed to a structured XML document, for example). At 102, respective rows of a document may be clustered based upon row proximity and/or numeric content to generate one or more row clusters (e.g., FIGS. 2A-2C). The row proximity may correspond to a distance between rows or row clusters. In an example, the row proximity may correspond to an amount of white space between rows. In another example, the row proximity may be derived from Y coordinates extracted from a portable document format (PDF) file associated with the document (e.g., Y coordinates of a first row may be compared with Y coordinates of a second row). The row proximity may be based upon the notion that information within a first row may not logically correspond to information within a second row that is separated from the first row by a particular distance or amount of white space. For example, an author may group information regarding equipment temperatures towards a top portion of the document, and may group information regarding employee work schedules towards a bottom portion of the document. In an example, the numeric content may correspond to a ratio of numeric words to non-numeric words within a row or a percentage of numeric words within the row. In another example, the numeric content may correspond to a ratio of numeric characters to non-numeric characters within a row or a percentage of numeric characters within the row. If two rows satisfy the row proximity and have relatively similar numeric content, then the two rows may comprise logically related information and thus may be clustered together. If two rows satisfy the row proximity but have relatively dissimilar numeric content, then the two rows may not comprise logically related information and thus may be clustered into separate row clusters. If two rows do not satisfy the row proximity, then the two rows may be clustered into separate row clusters.

In an example, a first row and a second row may satisfy the row proximity (e.g., the first row and the second row may be separated by a single white space row comprising merely white space, which may satisfy a row proximity specifying that rows separated by more than 3 white space rows are not to be clustered together). A first numeric content of the first row may be determined. A second numeric content of the second row may be determined. Responsive to the second numeric content not exceeding a numeric deviation threshold with respect the first numeric content (e.g., if the first numeric content is 54% and the second numeric content is 60%, then a deviation of 6% may be within a numeric deviation threshold of 15%), the first row and the second row may be clustered into a row cluster (e.g., the similarity in an amount of numeric content between the first row and the second row may indicate that information within the first row may logically correspond to information within the second row). Responsive to the second numeric content exceeding the numeric deviation threshold with respect the first numeric content (e.g., if the first numeric content is 5% and the second numeric content is 60%, then a deviation of 55% may exceed the numeric deviation threshold of 15%), the first row may be clustered into a first row cluster and the second row may be clustered into a second row cluster (e.g., the difference in numeric content between the first row and the second row may indicate that information within the first row does not logically correspond to information within the second row).

In another example, a first row and a second row may be clustered within a first row cluster. A third row satisfying the row proximity with respect to the first row cluster may be identified. A first numeric content of the first row cluster may be determined (e.g., an average value of numeric content of the first row and the second row). Second numeric content of the third row may be determined. Responsive to the second numeric content not exceeding a numeric deviation threshold with respect the first numeric content (e.g., if the first numeric content is 57% and the second numeric content is 60%, then a deviation of 3% may be within a numeric deviation threshold of 15%), the third row may be clustered into the first row cluster (e.g., the similarity in an amount of numeric content between the third row and the first row cluster may indicate that information within the third row may logically correspond to information within the first row and/or the second row of the first row cluster). Responsive to the second numeric content exceeding the numeric deviation threshold with respect the first numeric content (e.g., if the first numeric content is 57% and the second numeric content is 97%, then a deviation of 40% may exceed the numeric deviation threshold of 15%), the third row may be clustered into a second row cluster (e.g., the difference in numeric content between the third row and the first row cluster may indicate that information within the third row does not logically correspond to information within the first row and/or the second row).

In another example, responsive to a fourth row not satisfying the row proximity with respect to at least one row cluster or at least one row, the fourth row may be clustered into a third row cluster (e.g., where the third row cluster merely comprises the fourth row). In this way, respective rows of the document may be clustered into one or more row clusters because a row cluster may comprise one or more rows with information that may be logically related (e.g., a first row comprising hydrogen temperatures measured every day of a week may comprise similar information as a second row comprises oxygen temperatures measured everyday of the week).

Figure 3:
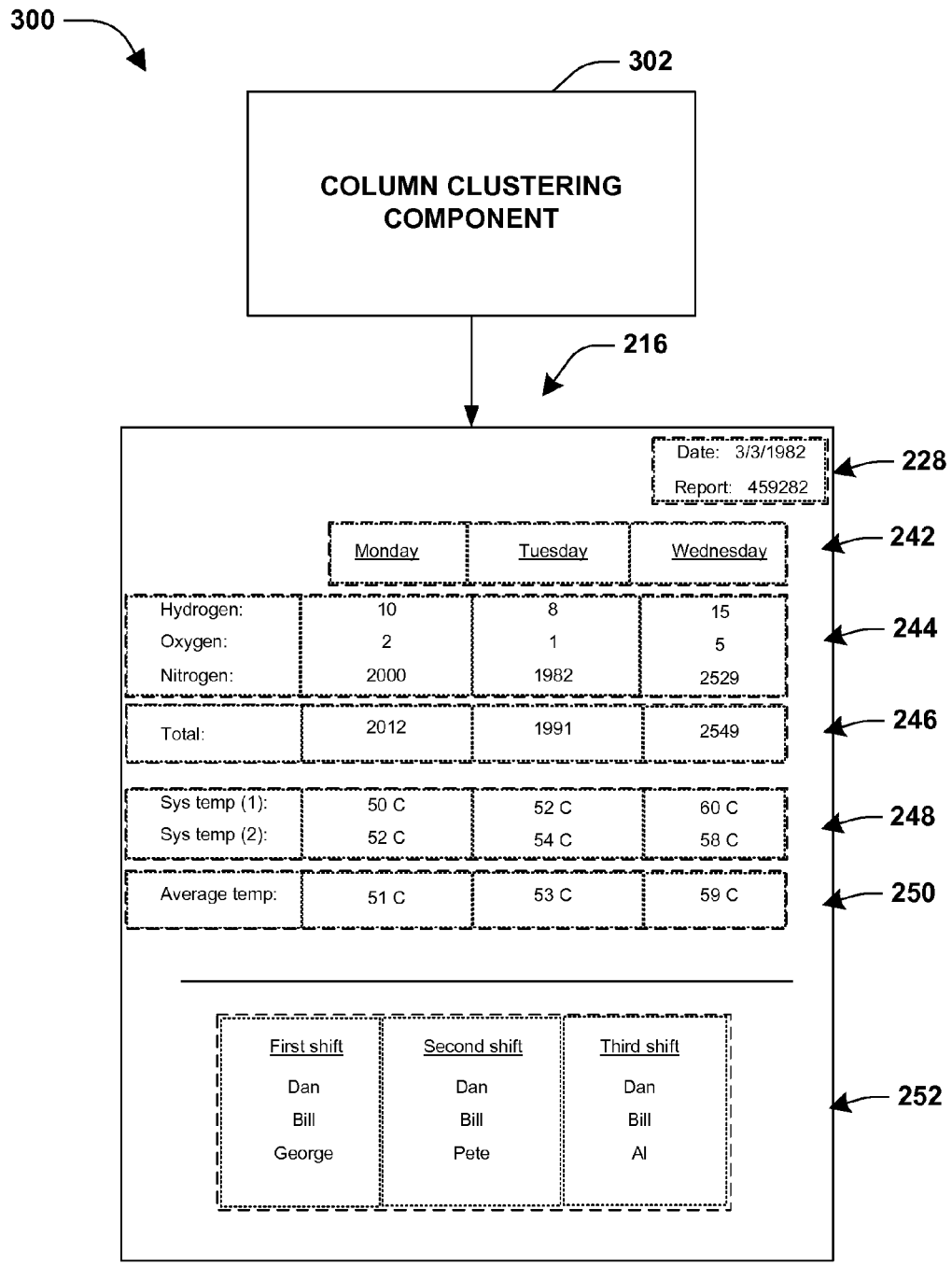
FIG. 3 is a component block diagram illustrating an exemplary system for generating one or more vertical clusters within respective row clusters of a document.

At 104, one or more vertical clusters may be generated for respective row clusters based upon vertical overlap within a current row cluster (e.g., FIG. 3). In some embodiments, an X,Y-cut algorithm is performed to generate the one or more vertical clusters. In some embodiments, vertical overlap may be used to generate the one or more vertical clusters. In an example, a first row, a second row, and/or other rows may be clustered into a first row cluster. A first word within the first row may be identified. A second word within a second row may be identified. Responsive to identifying vertical overlap between the first word and the second word, the first word and the second word may be clustered into a vertical cluster within the first row cluster (e.g., the first word and the second word may be logical related, such as the first word corresponding to a temperature measurement of hydrogen on Monday and the second word corresponding to a temperature measurement of oxygen on Monday). Responsive to identifying no vertical overlap between the first word and the second word, the first word may be clustered into a first vertical cluster within the first row cluster and the second word may be clustered into a second vertical cluster within the first row cluster (e.g., the first word and the second word may not be logical related, such as the first word corresponding to a temperature measurement of hydrogen on Monday and the second word corresponding to a temperature measurement of oxygen on Tuesday).

In another example, a third vertical cluster, within the first row cluster, may be generated to comprise a third word and a fourth word based upon vertical overlap between the third word and the fourth word, where the third word is comprised within a third row and the fourth word is comprised within a fourth row where the third row and the fourth row are comprised within the first row cluster. A fifth word within a fifth row of the first row cluster may be identified. Responsive to identifying vertical overlap between the fifth word and at least one of the third word or the fourth word, the fifth word may be clustered into the third vertical cluster. Responsive to identifying no vertical overlap between the fifth word and at least one of the third word or the fourth word, the fifth word may be clustered into a fourth vertical cluster within the first row cluster. In this way, one or more vertical clusters may be generated within respective row clusters.

Because the document may have been parsed into row clusters and/or vertical clusters, information may be retrieved from the document even if the document was arbitrarily formatted. At 106, a matching row cluster may be identified from the one or more row clusters based upon the matching row cluster comprising a search term. For example, the one or more row clusters may be search for the term "oxygen measurement", which may be identified within the matching row cluster based upon one or more words, within the matching row cluster, matching the search term "oxygen measurement".

At 108, pattern matching may be performed upon one or more vertical clusters within the matching row cluster using a pattern criteria to identify a value for the search term. For example, the pattern criteria may correspond to a two digit number or a three digit number followed by "F" or "C". In an example, a current vertical cluster, within the matching row cluster, that comprises the search term may be identified. The current vertical cluster may be searched to determine whether the current vertical cluster comprises a word (e.g., a character, a grouping of characters, or one or more groupings of characters, such as "50 F") that satisfies the pattern criteria. Responsive to identifying a word that satisfies the pattern criteria, the word may be identified as the value for the search term (e.g., "50 F" may be identified as a value for the oxygen measurement). In another example, respective vertical clusters within the matching row cluster may be evaluated to determine whether a word within a current vertical cluster satisfies the pattern criteria (e.g., the word may be identified within a current vertical cluster that is adjacent to a vertical cluster comprising the search term). In another example, a row, within the matching row cluster, may be identified as comprising the search term. Respective vertical clusters, within the matching row cluster, that encompass at least a portion of the row may be searched for a word, within the row and within a current vertical cluster, that satisfies the pattern criteria. In another example, a current vertical cluster, within the matching row cluster, may be identified based upon the current vertical cluster comprising the search term. A second vertical cluster (e.g., within the matching row cluster or another row cluster) may be identified based upon the second vertical cluster having vertical overlap with the current vertical cluster. The second vertical cluster may be searched for a word that satisfies the pattern criteria. In this way, the matching row cluster may be searched for a word that may be used as a value for the search term.

Figure 2A:
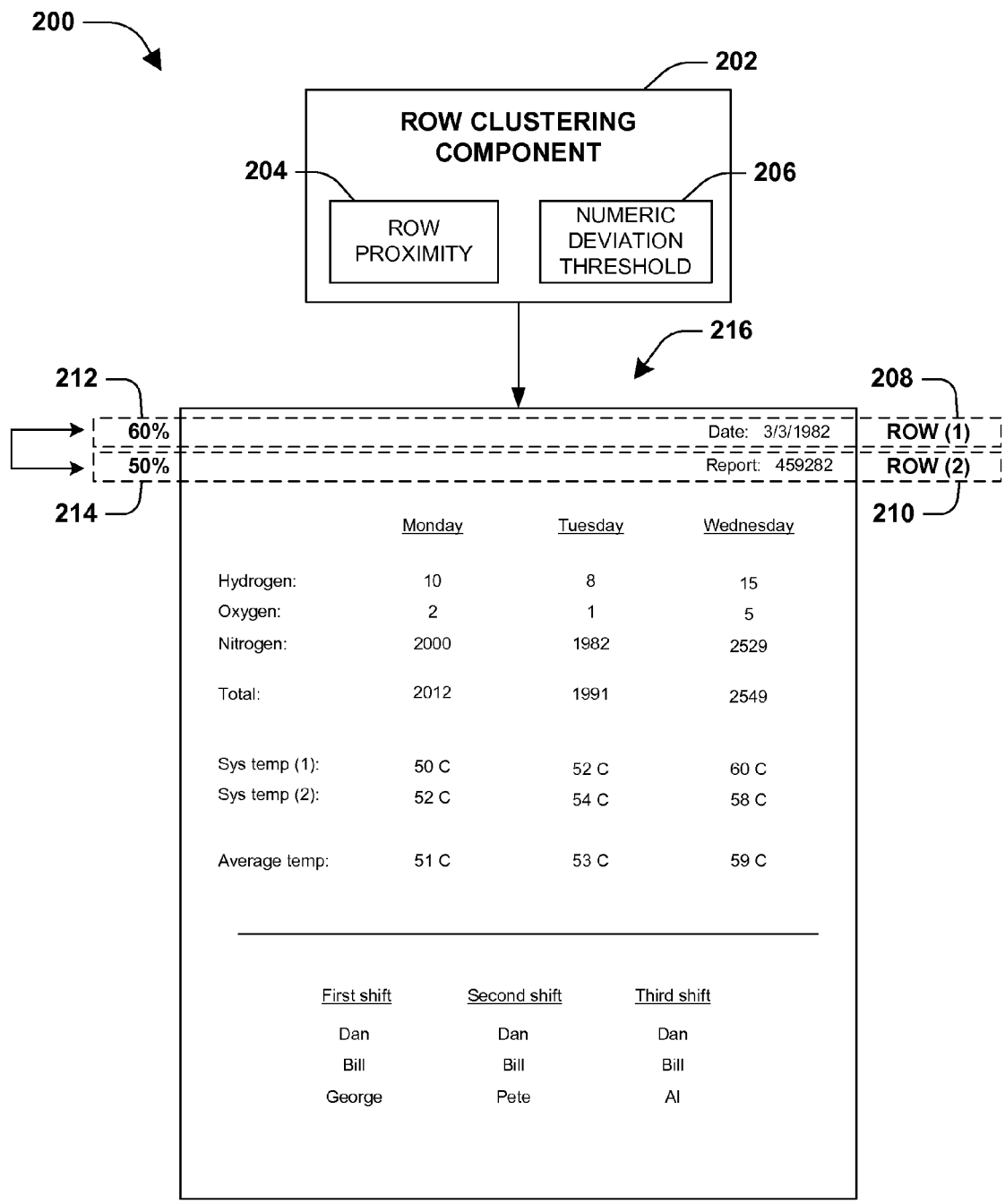
FIG. 2A is a component block diagram illustrating an exemplary system of clustering respective rows of a document.

FIG. 2A illustrates an example of a system 200 configured for clustering respective rows of a document 216. In some embodiments, the document 216 comprises an inspection report associated with electrical equipment. The system 200 comprises a row clustering component 202. The row clustering component 202 may maintain a row proximity 204 used to determine whether a distance between rows and/or row clusters (e.g., an amount of white space) exceeds a threshold, and thus such rows and/or row clusters may not be clustered together where the row proximity 204 is not satisfied (e.g., the row proximity 204 may be satisfied if no more than 2 rows of white space separate rows or row clusters). The row clustering component 202 may maintain a numeric deviation threshold 206 used to determine whether a difference in numeric content between rows or row clusters is below the numeric deviation threshold 206 such that the rows or row clusters are clustered together.

Figure 2B:
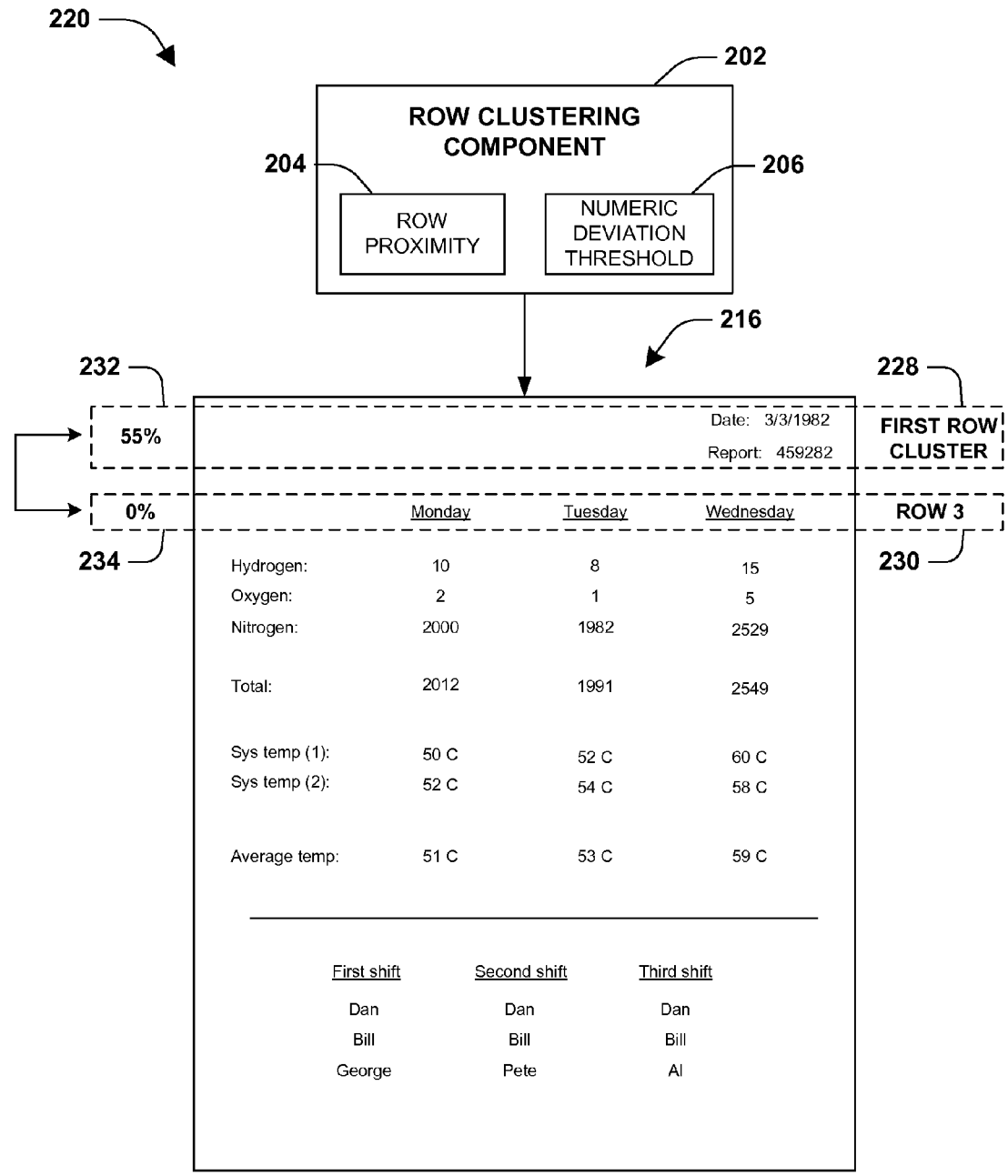
FIG. 2B is a component block diagram illustrating an exemplary system of clustering respective rows of a document.

In an example, the row clustering component 202 may determine that a second row 210 satisfies the row proximity 204 with respect to a first row 208 (e.g., the first row 208 may be adjacent to the second row 210 with no intervening rows). The row clustering component 202 may determine a first numeric content 212 of 60% for the first row 208. The row clustering component 202 may determine a second numeric content 214 of 50% for the second row 210. The row clustering component 202 may determine that the first numeric content 212 of 60% does not exceed the numeric deviation threshold 206 with respect to the second numeric content of 50% (e.g., a deviation of 10% does not exceed a 24% deviation in numeric content). Accordingly, the row clustering component 202 may cluster the first row 208 and the second row 210 into a first row cluster 228, as illustrated in FIG. 2B. In this way, the first row 208 and the second row 210 are clustered together based upon similarities in numeric content, which may indicate a logical relationship between information within such rows.

FIG. 2B illustrates an example of a system 220 configured for clustering respective rows of a document 216. In one example, the system 220 corresponds to the system 200 of FIG. 2A. For example, the system 220 comprises a row clustering component 202 that maintains a row proximity 204 (e.g., the row proximity 204 may be satisfied if no more than 2 rows of white space separate rows or row clusters) and a numeric deviations threshold 206 (e.g., a 24% deviation in numeric content) used to determine whether rows and/or row clusters may be clustered together (e.g., a first row 208 and a second row 210 may be clustered together into the first row cluster 228).

Figure 2C:
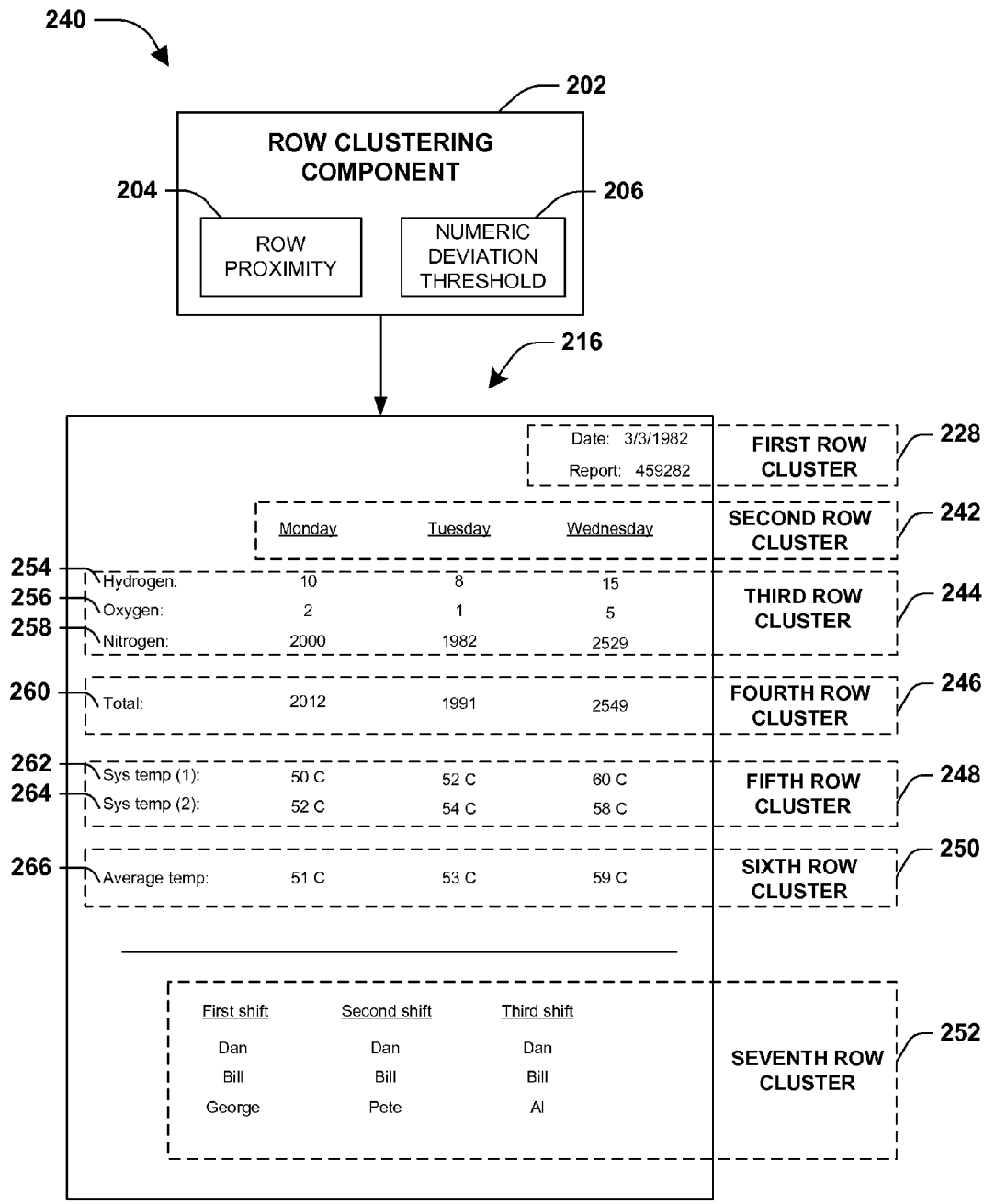
FIG. 2C is a component block diagram illustrating an exemplary system of clustering respective rows of a document.

In an example, the row clustering component 202 may determine that the third row 230 satisfies the row proximity 204 with respect to the first row cluster 228 (e.g., a single row of white space may separate the first row cluster 228 and the third row 230). The row clustering component 202 may determine a first numeric content 232 of 55% for the first row cluster 228. The row clustering component 202 may determine a second numeric content 234 of 0% for the third row 230. The row clustering component 202 may determine that the first numeric content 232 exceeds the numeric deviation threshold 206 with respect to the second numeric content 234 (e.g., a 55% deviation exceeds the 24% numeric deviation threshold 206). Accordingly, the row clustering component 202 may cluster the third row 230 into a second row cluster 242, as illustrated in FIG. 2C. In this way, the first row cluster 228 and the third row 230 are not clustered together based upon dissimilarity in numeric content, which may indicate a lack of logical relationship between information within the first row cluster 228 and the third row 230.

FIG. 2C illustrates an example of a system 240 configured for clustering respective rows of a document 216. In one example, the system 240 corresponds to the system 220 of FIG. 2B. For example, the system 240 comprises a row clustering component 202 that maintains a row proximity 204 (e.g., the row proximity 204 may be satisfied if no more than 2 rows of white space separate rows or row clusters) and a numeric deviations threshold 206 (e.g., a 24% deviation in numeric content) used to determine whether rows and/or row clusters may be clustered together (e.g., a first row 208 and a second row 210 may be been clustered together into the first row cluster 228, and a third row 230 may have been clustered into a second row cluster 242).

In an example, the row clustering component 202 may cluster a fourth row 254, a fifth row 256, and a sixth row 258 into a third row cluster 244 based upon a similarity in numeric content amongst such rows. The row clustering component 202 may cluster a seventh row 260 into a fourth row cluster 246. Even though numeric content may be relatively similar between the third row cluster 244 and the seventh row 260, the seventh row 260 may not be clustered into the third row cluster 242 because the row proximity 204 may not be satisfied (e.g., three rows of white space may separate the third row cluster 244 from the seventh row 260). The row clustering component 202 may cluster an eighth row 262 and a ninth row 264 into a fifth row cluster 248 based upon similarity in numeric content between the eighth row 262 and the ninth row 264, but may not cluster such rows into the fourth row cluster 246 because the row proximity 204 is not met. The row clustering component 202 may cluster a tenth row 266 into a sixth row cluster 250, but not the fifth row cluster 248, because the row proximity 204 is not met. The row cluster component 202 may cluster one or more additional rows into a seventh row cluster 252 based upon similarity in numeric content. For example, numeric content may correspond to an amount of numeric characters within a row as opposed to an amount of numeric words within the row (e.g., "first shift" is deemed non-numeric because "first shift" lacks numeric characters, whereas "first shift" may otherwise be deemed a numeric word because of the word "first"), and thus the one or more additional rows may be determined to have 0% numeric content which does not exceed the numeric deviation threshold 206 (e.g., a 0% deviation is less than the threshold deviation of 24%). In this way, the document 216 is parsed into one or more row clusters.

FIG. 3 illustrates an example of a system 300 configured for generating one or more vertical clusters within respective row clusters of a document 216. In an example, the system 300 may correspond to the system 240 of FIG. 2C. For example, a row clustering component 202 may have clustered respective rows of the document 216 into one or more row clusters, such as a first row cluster 228, a second row cluster 242, a third row cluster 244, a fourth row cluster 246, a fifth row cluster 248, a sixth row cluster 250, and a seventh row cluster 252, as illustrated in FIG. 2C.

The system 300 may comprise a column clustering component 302. The column clustering component 302 may be configured to generate one or more vertical clusters for respective row clusters based upon vertical overlap within a current row cluster. In an example, the column clustering component 302 may generate a first vertical cluster within the first row cluster 228 based upon vertical overlap between "Date: Mar. 31, 1982" and "Report: 459282". In another example, the column clustering component 302 may generate a second vertical cluster comprising "Monday", a third vertical cluster comprising "Tuesday", and a fourth vertical cluster comprising "Wednesday" within the second row cluster 242 based upon a lack of vertical overlap.

In an example, the column clustering component 302 may generate a fifth vertical cluster comprising "Hydrogen:", "Oxygen:", and "Nitrogen:" within the third row cluster 244 based upon vertical overlap between such words. The column clustering component 302 may generate a sixth vertical cluster comprising "10", "2", and "2000" within the third row cluster 244 based upon vertical overlap between such words. The column clustering component 302 may generate a seventh vertical cluster comprising "8", "1", and "1982" within the third row cluster 244 based upon vertical overlap between such words. The column clustering component 302 may generate an eighth vertical cluster comprising "15", "5", and "2529" within the third row cluster 244 based upon vertical overlap between such words. In this way, one or more vertical clusters may be generated within respective row clusters based upon vertical overlap, such as vertical overlap between a first word of a first row within a row cluster and a second word of a second row within the row cluster.

Figure 4:
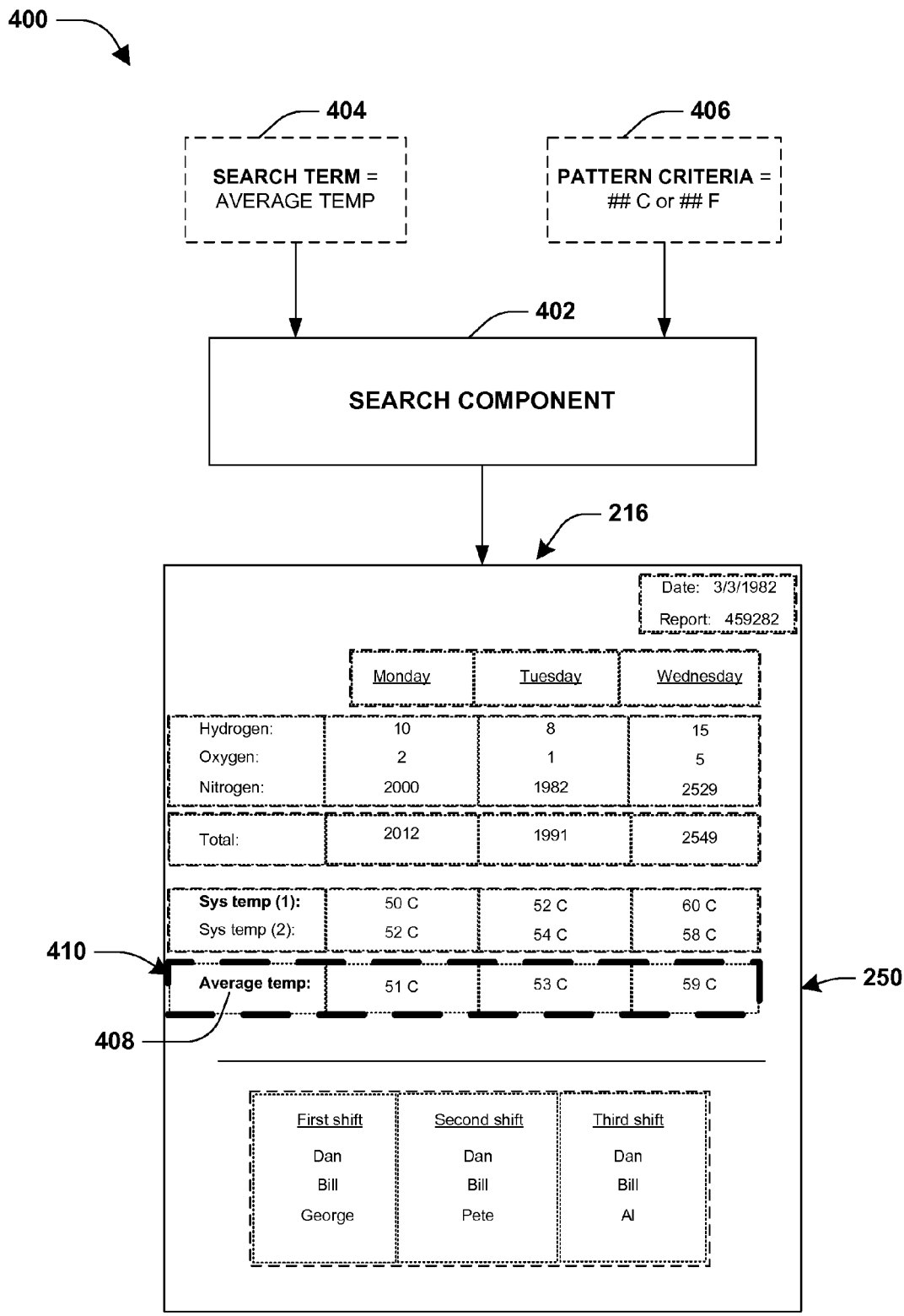
FIG. 4 is a component block diagram illustrating an exemplary system for performing a pattern matching technique to identify a value for a search term within a document.

FIG. 4 illustrates an example of a system 400 configured for performing a pattern matching technique to identify a value for a search term 404 within a document 216. The system 400 may comprise a search component 402. The search component 402 may be configured to identify a value for the search term 404 of "Average temp" based upon a word, within a matching row cluster, corresponding to a pattern criteria 406 of "## C" or "## F". For example, the pattern criteria 406 may indicate that a temperature value for an average temperature may be expected to have two numbers followed by either a "C" or an "F". Accordingly, the search component 402 may identify a matching row cluster, such as a sixth row cluster 250 of the document 216, based upon the sixth row cluster 250 comprising a first vertical cluster 410 having the word "Average temp:" 408 that matches the search term 404 "Average temp". The search component 402 may search vertical clusters within the sixth row cluster 250 to identify a value for the search term 404, such as a value of 51 C from a second vertical cluster, a value of 53 C from a third vertical cluster, and/or a value of 59 C from a fourth vertical cluster.

Figure 5:
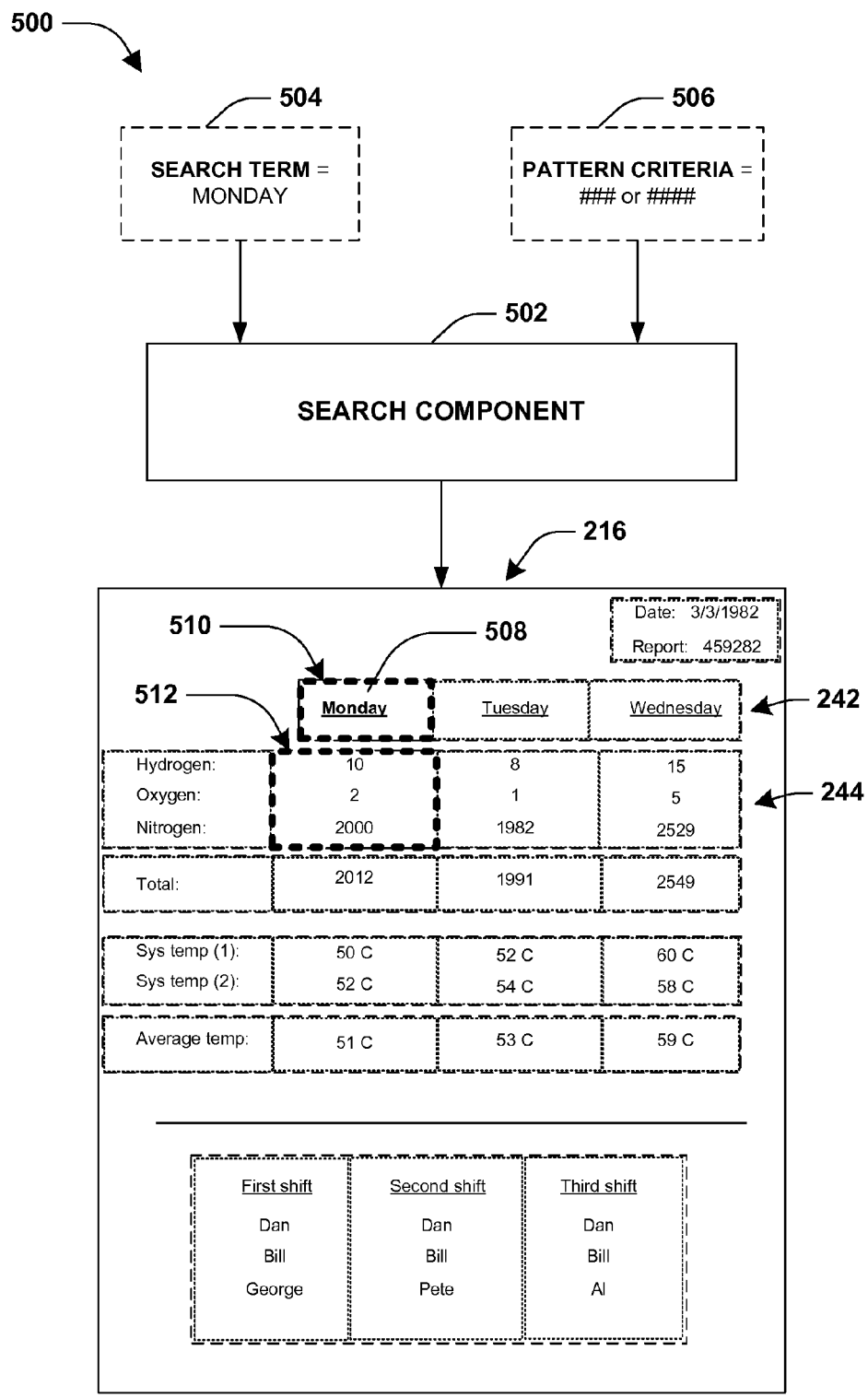
FIG. 5 is a component block diagram illustrating an exemplary system for performing a pattern matching technique to identify a value for a search term within a document.

FIG. 5 illustrates an example of a system 500 configured for performing a pattern matching technique to identify a value for a search term 504 within a document 216. The system 500 may comprise a search component 502. The search component 502 may be configured to identify a value for the search term 504 of "Monday" based upon a word corresponding to a pattern criteria 506 of "###" or "####". For example, the pattern criteria 506 may indicate that a value (e.g., a nitrogen measurement on Monday) may be expected to have either three numbers or four numbers. Accordingly, the search component 502 may identify a matching row cluster, such as a second row cluster 242 of the document 216, based upon the second row cluster 242 comprising a first vertical cluster 510 having the word "Monday" 508 that matches the search term 504 of "Monday". Because respective vertical clusters of the second row cluster 242 do not comprise a word that matches the pattern criteria 506, the search component 502 may be configured to search a second vertical cluster 512, within a third row cluster 244, that has vertical overlap with respect to the first vertical cluster 512. For example, the search component 502 may identify "2000" from the second vertical cluster 512 as a value for the search term 504 of "Monday" based upon "2000" matching the pattern criteria 506.

Figure 6:
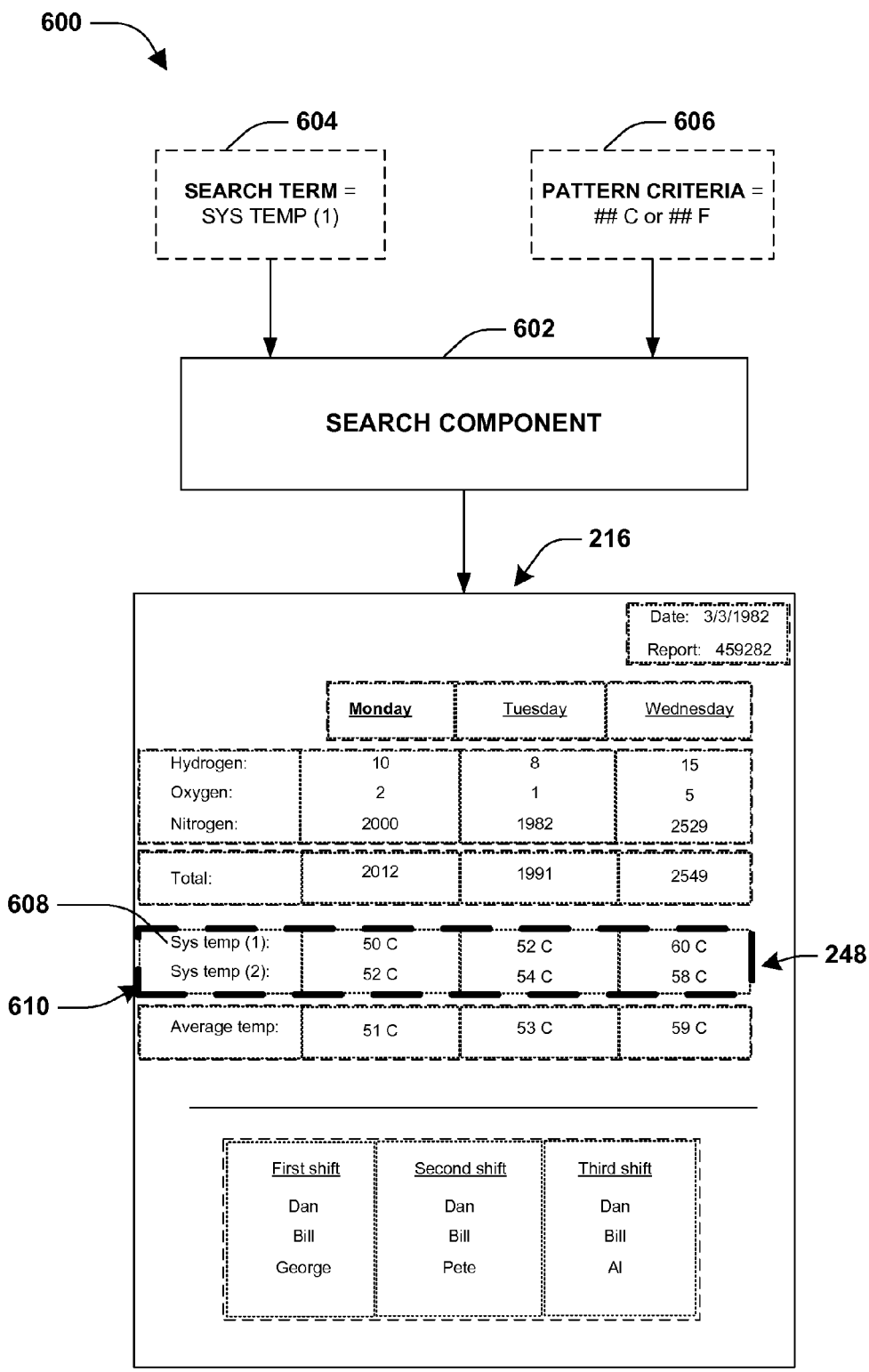
FIG. 6 is a component block diagram illustrating an exemplary system for performing a pattern matching technique to identify a value for a search term within a document.

FIG. 6 illustrates an example of a system 600 configured for performing a pattern matching technique to identify a value for a search term 604 within a document 216. The system 600 may comprise a search component 602. The search component 602 may be configured to identify a value for the search term 604 of "Sys temp (1)" based upon a word corresponding to a pattern criteria 606 of "## C" or "## F". For example, the pattern criteria 606 may indicate that a temperature value for a Sys temp (1) may be expected to have two numbers followed by either a "C" or an "F". Accordingly, the search component 602 may identify a matching row cluster, such as a fifth row cluster 248 of the document 216, based upon the fifth row cluster 248 comprising a first vertical cluster 610 having the word "Sys Temp (1):" 608 that matches the search term 604 "Sys temp (1)". The search component 602 may search vertical clusters within the fifth row cluster 248 in order to identify a value for the search term 604, such as 50 C and/or 52 C from a second vertical cluster, 52 C and/or 54 C from a third vertical cluster, and/or 60 C and/or 58 C from a fourth vertical cluster. Words within a row that comprises the word "Sys Temp (1):" 608 (e.g., 50 C, 52 C, and 60 C within a first row of the fifth row cluster 248) may be ranked relatively higher than words within other rows of the fifth row cluster 248 (e.g., 52 C, 54 C, and 58 C within a second row comprising "System temp (2)) because "Sys Temp (1):" 608 matches the search term 604.

Figure 7:
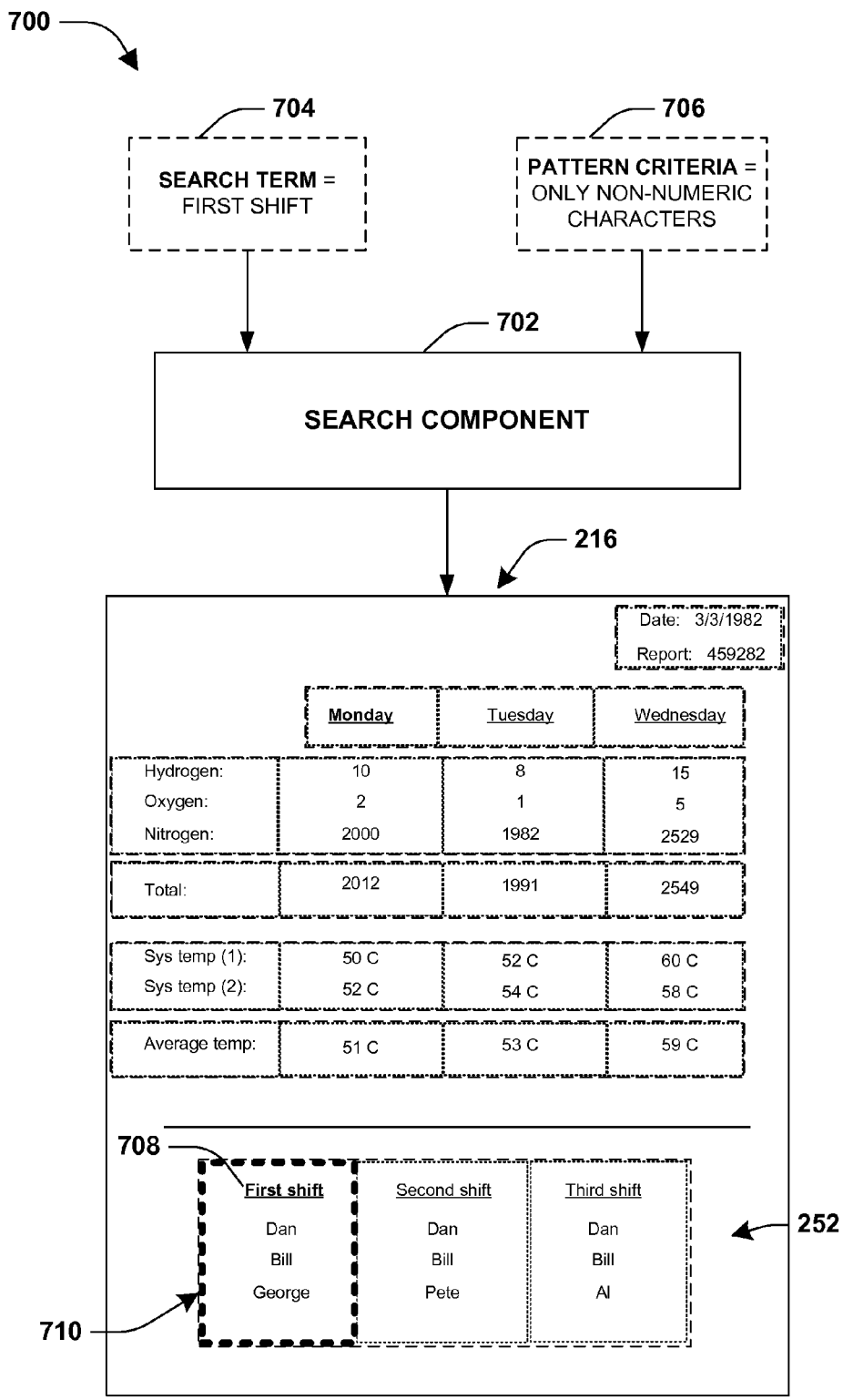
FIG. 7 is a component block diagram illustrating an exemplary system for performing a pattern matching technique to identify a value for a search term within a document.

FIG. 7 illustrates an example of a system 700 configured for performing a pattern matching technique to identify a value for a search term 704 within a document 216. The system 700 may comprise a search component 702. The search component 702 may be configured to identify a value for the search term 704 of "First shift" based upon a word corresponding to a pattern criteria 706 of only non-numeric characters. For example, the pattern criteria 706 may indicate that an employee name value for a First shift may be expected to have merely non-numeric characters. Accordingly, the search component 702 may identify a matching row cluster, such as a seventh row cluster 252 of the document 216, based upon the seventh row cluster 252 comprising a first vertical cluster 710 having the word "First shift" 708 that matches the search term 704 of "First shift". The search component 702 may search within the first vertical cluster 710 in order to identify a value for the search term 704 based upon words having only non-numeric characters. For example, "Dan", "Bill", and/or "George" may be identified as values for the search term 704 of "First shift".

Figure 8:
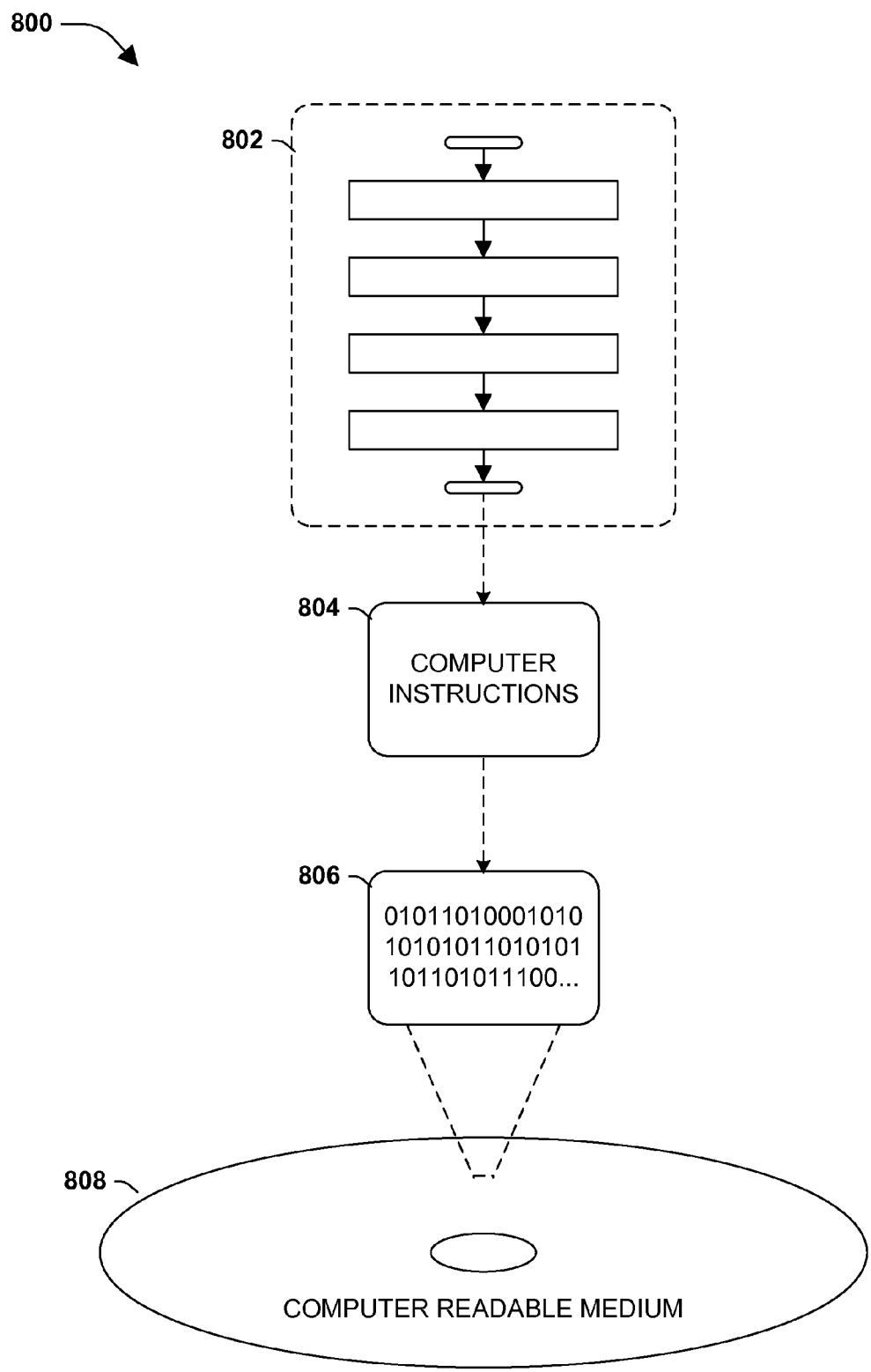
FIG. 8 is an illustration of an exemplary computing device-readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-R, DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 100 of FIG. 1, for example. In some embodiments, the processor-executable instructions 804 are configured to implement a system, such as at least some of the exemplary system 200 of FIG. 2A, at least some of the exemplary system 220 of FIG. 2B, at least some of the exemplary system 240 of FIG. 2C, at least some of the exemplary system 300 of FIG. 3, at least some of the exemplary system 400 of FIG. 4, at least some of the exemplary system 500 of FIG. 5, at least some of the exemplary system 600 of FIG. 6, and/or at least some of the exemplary system 700 of FIG. 7, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
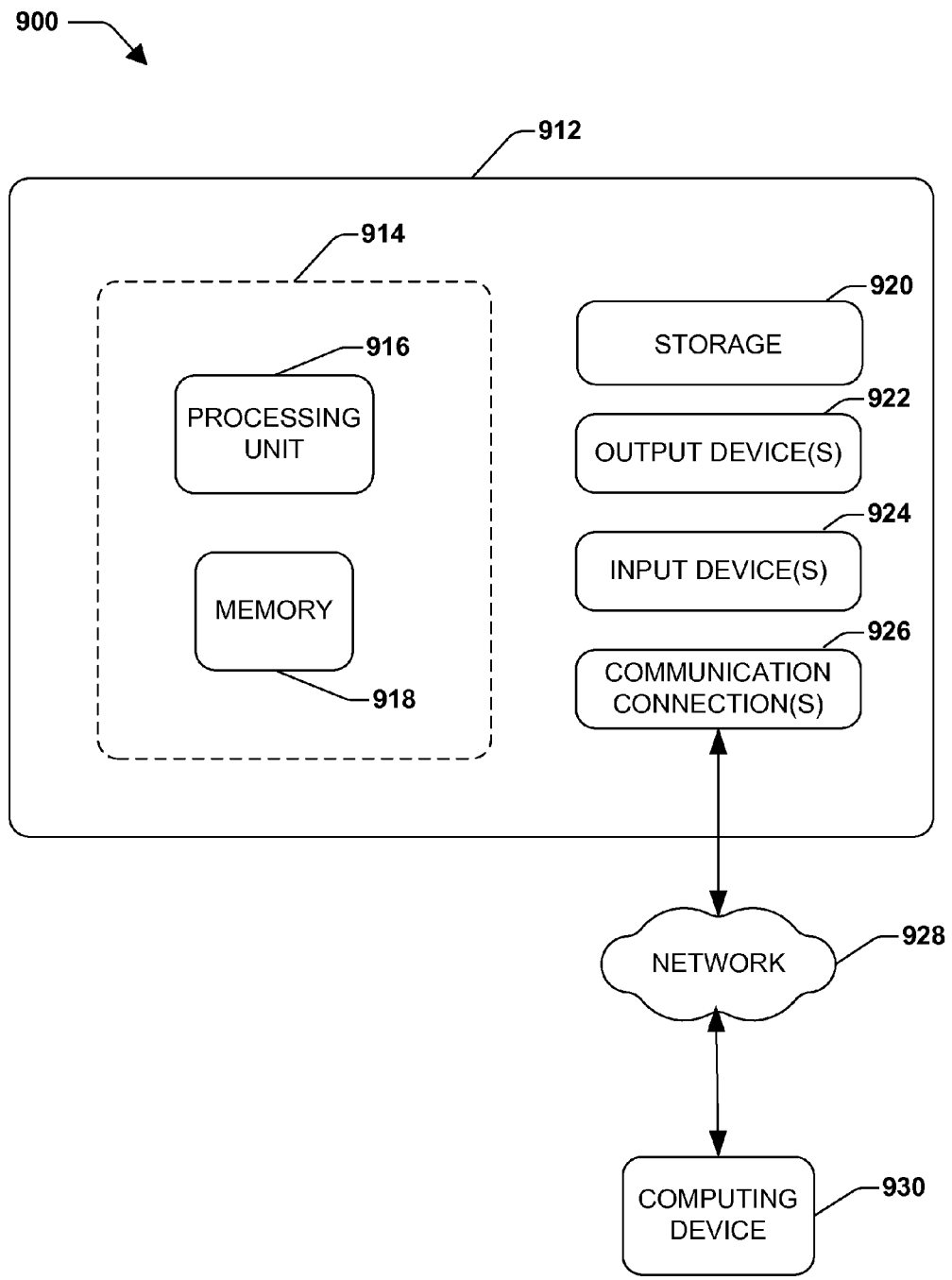
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 13104), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via a network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Further, unless specified otherwise, "first," "second," and/ or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A method for parsing tabular data of a document, comprising:
   receiving a request to identify a value within a document for a search term;
   clustering rows of the document into row clusters based upon row proximity and numeric content by:
      clustering a first row and a second row into a first row cluster based upon (i) a row proximity where an amount of space between the first row and the second row is below a threshold amount and (ii) first numeric content of the first row not exceeding a numeric deviation threshold with respect to second numeric content of the second row;
   for each row cluster, generating vertical clusters within a row cluster by:
      responsive to identifying vertical overlap between a first word within the first row and a second word within the second row, creating a first vertical cluster of the first word and the second word within the first row cluster; and
      responsive to identifying no vertical overlap between the first word within the first row and a third word within the second row, creating a second vertical cluster of the third word within the first row cluster; and
   searching the document for the value by:
      identifying a matching row cluster comprising the search term;
      determining a pattern criteria of at least one of characters, spaces, or placeholders corresponding to a data format expected for the value of the search term;
      evaluating vertical clusters within the matching row cluster, but not vertical clusters not within the matching row cluster, using the pattern criteria to identify the value for the search term, wherein words within a same row as a row comprising the search term are ranked higher for searching first than words within other rows; and
      providing the value in response to the request.

2. The method of claim 1, wherein the row proximity specifies that two rows are to be clustered together if there is no more than two rows of space between the two rows.

3. The method of claim 1, wherein vertical clusters do not span more than one row cluster.

4. The method of claim 1, wherein the pattern criteria specifies that non-numeric characters are to be searched for identifying a name as the value.

5. The method of claim 1, wherein the pattern criteria specifies that a string having a certain number of characters is to be searched for identifying the value.

6. The method of claim 1, comprising:
   responsive to not identifying the value, searching a vertical cluster not within the matching row cluster.

7. The method of claim 1, comprising:
   responsive to not identifying the value, searching a vertical cluster not within the matching row cluster based upon the vertical cluster having vertical overlap with at least one vertical cluster within the matching row cluster.

8. The method of claim 1, comprising:
   searching words within the vertical clusters based upon ranks assigned to the words.

9. The method of claim 1, wherein the row proximity specifies that two rows are to be clustered together if there is no more than two rows of white space between the two rows.

10. The method of claim 1, wherein the pattern criteria specifies that a character is to be searched for identifying the value.

11. A non-transitory computer readable medium comprising instructions which when executed at least in part via a processing unit perform a method for parsing tabular data of a document, comprising:
   receiving a request to identify a value within a document for a search term;
   clustering rows of the document into row clusters based upon row proximity and numeric content by:
      clustering a first row and a second row into a first row cluster based upon (i) a row proximity where an amount of space between the first row and the second row is below a threshold amount and (ii) first numeric content of the first row not exceeding a numeric deviation threshold with respect to second numeric content of the second row;
   for each row cluster, generating vertical clusters within a row cluster by:

responsive to identifying vertical overlap between a first word within the first row and a second word within the second row, creating a first vertical cluster of the first word and the second word within the first row cluster; and responsive to identifying no vertical overlap between the first word within the first row and a third word within the second row, creating a second vertical cluster of the third word within the first row cluster; and searching the document for the value by:
identifying a matching row cluster comprising the search term;
determining a pattern criteria of at least one of characters, spaces, or placeholders corresponding to a data format expected for the value of the search term;
evaluating vertical clusters within the matching row cluster, but not vertical clusters not within the matching row cluster, using the pattern criteria to identify the value for the search term, wherein words within a same row as a row comprising the search term are ranked higher for searching first than words within other rows; and
providing the value in response to the request.

12. The non-transitory computer readable medium of claim 11, wherein the row proximity specifies that two rows are to be clustered together if there is no more than two rows of space between the two rows.

13. The non-transitory computer readable medium of claim 11, wherein vertical clusters do not span more than one row cluster.

14. The non-transitory computer readable medium of claim 11, wherein the pattern criteria specifies that non-numeric characters are to be searched for identifying a name as the value.

15. The non-transitory computer readable medium of claim 11, wherein the pattern criteria specifies that a string having a certain number of characters is to be searched for identifying the value.

16. The non-transitory computer readable medium of claim 11, comprising:
responsive to not identifying the value, searching a vertical cluster not within the matching row cluster.

17. The non-transitory computer readable medium of claim 11, comprising:
responsive to not identifying the value, searching a vertical cluster not within the matching row cluster based upon the vertical cluster having vertical overlap with at least one vertical cluster within the matching row cluster.

18. The non-transitory computer readable medium of claim 11, comprising:

searching words within the vertical clusters based upon ranks assigned to the words.

19. A system, comprising:
a memory containing machine readable medium comprising machine executable code having stored thereon instructions for performing a method; and
a processor coupled to the memory, the processor configured to execute the machine executable code to cause the processor to:
receive a request to identify a value within a document for a search term;
cluster rows of the document into row clusters based upon row proximity and numeric content by:
clustering a first row and a second row into a first row cluster based upon (i) a row proximity where an amount of space between the first row and the second row is below a threshold amount and (ii) first numeric content of the first row not exceeding a numeric deviation threshold with respect to second numeric content of the second row;
for each row cluster, generate vertical clusters within a row cluster by:
responsive to identifying vertical overlap between a first word within the first row and a second word within the second row, creating a first vertical cluster of the first word and the second word within the first row cluster; and
responsive to identifying no vertical overlap between the first word within the first row and a third word within the second row, creating a second vertical cluster of the third word within the first row cluster; and
search the document for the value by:
identifying a matching row cluster comprising the search term;
determining a pattern criteria of at least one of characters, spaces, or placeholders corresponding to a data format expected for the value of the search term;
evaluating vertical clusters within the matching row cluster, but not vertical clusters not within the matching row cluster, using the pattern criteria to identify the value for the search term, wherein words within a same row as a row comprising the search term are ranked higher for searching first than words within other rows; and
providing the value in response to the request.

20. The system of claim 19, wherein the row proximity specifies that two rows are to be clustered together if there is no more than two rows of space between the two rows.

* * * * *